United States Patent
He (10) Patent No.: US 11,307,472 B2
(45) Date of Patent: Apr. 19, 2022

(54) DISPLAY PANEL AND DISPLAY DEVICE (71) Applicant: HKC CORPORATION LIMITED, Shenzhen (CN)

(72) Inventor: Huailiang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/033,817

(22) Filed: Sep. 27, 2020

(65) Prior Publication Data
US 2021/0011318 A1  Jan. 14, 2021

Related U.S. Application Data (63) Continuation of application No. PCT/CN2018/121682, filed on Dec. 18, 2018.

(30) Foreign Application Priority Data

Oct. 8, 2018 (CN) .......................... 201811170806.X (51) Int. Cl.
*G02F 1/1368* (2006.01)
*G02F 1/1343* (2006.01)
*G09G 3/36* (2006.01)

(52) U.S. Cl.
CPC ...... *G02F 1/1368* (2013.01); *G02F 1/134309* (2013.01); *G09G 3/3607* (2013.01); *G09G 3/3696* (2013.01); *G02F 1/134345* (2021.01)

(58) Field of Classification Search
CPC ............. G02F 1/1368; G02F 1/134309; G02F 1/134345; G09G 3/3607; G09G 3/3696
(Continued)

(56) References Cited

U.S. PATENT DOCUMENTS

2009/0322659 A1* 12/2009 Chan ................. G02F 1/136213
   345/87
2011/0156993 A1* 6/2011 Ting ..................... G09G 3/3648
   345/87
(Continued)

FOREIGN PATENT DOCUMENTS

CN  101308297 A  11/2008
CN  102566163 A  7/2012
(Continued)

OTHER PUBLICATIONS

First Office Action in counterpart Chinese Application No. 201811170806.X, dated Oct. 25, 2019.
(Continued)

*Primary Examiner* — Charles S Chang
(74) *Attorney, Agent, or Firm* — Westbridge IP LLC (57) ABSTRACT

A display panel and a display device are provided. The display panel includes a plurality of pixel units, which includes a first pixel unit and a second pixel unit. The first and second pixel units are adjacently arranged in a vertical direction. The first pixel unit includes a first subpixel, and the second pixel unit includes a second subpixel corresponding to the first subpixel. The first subpixel includes a first region and a second region which are vertically arranged. The second region arranged closer to the second subpixel with respect to the first region includes a third region. A transmittance of the first region is smaller than a transmittance of the second region, and the ratio of the area of the second region to the area of the third region is smaller than or equal to 4:6 and greater than or equal to 3:7.

20 Claims, 3 Drawing Sheets

(58) Field of Classification Search
USPC .................................................. 349/142–144
See application file for complete search history.

(56) References Cited

U.S. PATENT DOCUMENTS

| | | |
|---|---|---|
| 2013/0120469 A1 | 5/2013 | Tien et al. |
| 2014/0063395 A1* | 3/2014 | Jung .................. G02F 1/13624 349/42 |
| 2014/0204326 A1* | 7/2014 | Wu .................. G02F 1/136286 349/143 |
| 2016/0077387 A1 | 3/2016 | Woo et al. |
| 2016/0216566 A1 | 7/2016 | Park et al. |

FOREIGN PATENT DOCUMENTS

| | | |
|---|---|---|
| CN | 104460077 A | 3/2015 |
| CN | 104460114 A | 3/2015 |
| CN | 104460149 A | 3/2015 |
| CN | 106773239 A | 5/2017 |
| CN | 107505760 A | 12/2017 |

OTHER PUBLICATIONS

International Search Report and Written Opinion in corresponding PCT Application No. PCT/CN2018/121682, dated Jul. 24, 2019.

* cited by examiner

DISPLAY PANEL AND DISPLAY DEVICE

CROSS-REFERENCE TO RELATED DISCLOSURES

The present application is a continuation application of International Application No. PCT/CN2018/121682, filed on Dec. 18, 2018, which claims the benefit of Chinese Patent Application No. 201811170806.X, entitled "DISPLAY PANEL AND DISPLAY DEVICE", filed on Oct. 8, 2018, which is hereby incorporated by reference in its entirety.

FIELD

The present application relates to the technical field of display products, and in particular, relates to a display panel and a display device.

BACKGROUND

The statements herein only provide background information related to this application and do not necessarily constitute prior art. A liquid crystal display panel is commonly composed of a color filter substrate, a thin film transistor array substrate, and a liquid crystal layer arranged between the two substrates. The inner sides of the two substrates facing to each other are arranged with pixel electrodes and common electrodes. Voltage is applied to control the motion direction of liquid crystal molecules, thereby refracting the light of a backlight module to present images. Liquid crystal displays include Twisted Nematic (TN) mode, Electronically Controlled Birefringence (ECB) mode, Vertical Alignment (VA) and other display modes. VA mode is a common display mode with advantages such as high contrast, wide viewing angle, and alignment without friction. However, liquid crystals in VA mode rotate vertically, and there exists large difference in birefringence of the liquid crystal molecules, which causes a serious color shift at large viewing angles.

Currently, the mainstream structures of pixels designed to improve the color shift includes structures of eight-domain pixels and four-domain pixels. Due to differences existing in domains and designs for drive, the color shift improved by four-domain dual pixel rendering technology may not reach the color shift improvement of eight-domain pixels, at low-medium gray scale.

SUMMARY

The main object of the present application is to provide a display panel to solve the problem in exemplary technology that at low-medium gray scale, the improvement of color shift by structures of four-domain pixel may not be as good as that of structures of eight-domain pixel.

In order to achieve the above object, the display panel provided by the application includes a plurality of pixel units which include a first pixel unit and a second pixel unit adjacently arranged in a vertical direction, the first pixel unit includes a first subpixel, and the second pixel unit includes a second subpixel corresponding to the first subpixel. The first subpixel includes a first region and a second region vertically arranged, and the second region is arranged closer to the second subpixel with respective to the first region and includes a third region. A transmittance of the first region is smaller than a transmittance of the second region, and a ratio of an area of the second region to an area of the third region is smaller than or equal to 4:6 and greater than or equal to 3:7.

Optionally, an area of the first region is larger than the area of the second region and is smaller than the area of the third region.

Optionally, a ratio of the area of the second region to the area of the first region is smaller than or equal to 4:6 and greater than or equal to 3:7.

Optionally, a total of the area of the first region and the area of the second region is equal to the area of the third region.

Optionally, a transmittance of the third region is larger than the transmittance of the first region and is smaller than the transmittance of the second region.

Optionally, pixel electrodes of the first region, the second region and the third region are all arranged in stripes, included angles formed between a horizontal direction and extending directions of the pixel electrodes in mutually corresponding domains of the first region, the second region and the third region are respectively $\alpha$, $\beta$, $\gamma$, and $\alpha$, $\beta$ and $\gamma$ meet a requirement of $|\beta-45°|<|\gamma-45°|<|\alpha-45°|$.

Optionally, $\alpha$, $\beta$, and $\gamma$ are all within a range from 0 degree to 45 degrees.

Optionally, a brightness of the first subpixel is consistent with a brightness of the second subpixel, when the display panel is at a high gray scale.

Optionally, the first subpixel is arranged corresponding to a switch unit.

Optionally, a Thin Film Transistor is arranged in each of subpixels.

The present application also provides a display panel, the display panel includes a plurality of pixel units, which includes a first pixel unit and a second pixel unit adjacently arranged in a vertical direction, the first pixel unit includes a first subpixel, and the second pixel unit includes a second subpixel corresponding to the first subpixel. The first subpixel includes a first region and a second region vertically arranged, the second region is arranged closer to the second subpixel with respective to the first region and includes a third region. The first region, the second region and the third region are all four-domain-regions, a voltage of the first subpixel is controlled to be larger than a voltage of the second subpixel. A transmittance of the first region is smaller than a transmittance of the second region, and a ratio of an area of the second region to an area of the third region is smaller than or equal to 4:6 and greater than or equal to 3:7.

The application also provides a display device, including a display module, the display module includes a display panel, and the display panel includes a plurality of pixel units, the plurality of pixel units include a first pixel unit and a second pixel unit adjacently arranged in a vertical direction. The first pixel unit includes a first subpixel, and the second pixel unit includes a second subpixel corresponding to the first subpixel. The first subpixel includes a first region and a second region vertically arranged. The second region is arranged closer to the second subpixel with respect to the first region, and includes a third region. A transmittance of the first region is smaller than a transmittance of the second region, and a ratio of an area of the second region to an area of the third region is smaller than or equal to 4:6 and greater than or equal to 3:7.

Optionally, an area of the first region is larger than the area of the second region and is smaller than the area of the third region.

Optionally, a ratio of the area of the second region to the area of the first region is smaller than or equal to 4:6 and greater than or equal to 3:7.

Optionally, a total of the area of the first region and the area of the second region is equal to the area of the third region.

Optionally, a transmittance of the third region is larger than the transmittance of the first region and is smaller than the transmittance of the second region.

Optionally, pixel electrodes of the first region, the second region and the third region are all arranged in stripes, included angles formed between a horizontal direction and extending directions of the pixel electrodes in mutually corresponding domains of the first region, the second region and the third region are respectively $\alpha$, $\beta$, $\gamma$, and $\alpha$, $\beta$ and $\gamma$ meet a requirement of $|\beta-45°|<|\gamma-45°|<|\alpha-45°|$.

Optionally, a brightness of the first subpixel is consistent with a brightness of the second subpixel, when the display panel is at a high gray scale.

Optionally, the first subpixel is arranged corresponding to a switch unit.

Optionally, a Thin Film Transistor is arranged in each of subpixels.

According to the technical solutions of the present application, the first subpixel of the first pixel unit, is designed to include a first four-domain-region and a second four-domain-region which are vertically arranged (the transmittance of the first four-domain-region is smaller than that of the second four-domain-region), and the second subpixel of the second subpixel unit corresponding to the first subpixel is designed to include a third four-domain-region, the second subpixel unit is vertically adjacent to the first pixel unit. The second four-domain-region is arranged close to the third four-domain-region, and the ratio of the area of the second four-domain-region to the area of the third four-domain-region is smaller than or equal to 4:6 and greater than or equal to 3:7. Thereby, the voltage between the first subpixel and the second subpixel is controlled so as to make the second four-domain-region form a main area of eight-domain pixels designed for improving the color shift (different transmittance makes the second four-domain-region distinct from the first four-domain-region), and to make the third four-domain-region form a secondary area of eight-domain pixels designed for improving the color shift. That is, the two areas cooperatively form a subpixel of eight-domain pixels with low color shift. Compared with the technical solution that using eight-domain pixels structure to improve the color shift, the technical solutions of the present application does not need to arrange a plurality of Thin Film Transistors in each subpixel, and does not need a complex pixel circuit. In the present disclosure, not only the aperture ratio of the pixel is increased but also the image retention is avoided.

BRIEF DESCRIPTION OF THE DRAWINGS

In order to more clearly explain the embodiments of the present disclosure or the technical solutions in the prior art, the drawings that need to be used in the description of embodiments or the prior art will be briefly introduced below. Obviously, the drawings in the following description are only some embodiments of the present disclosure. For those of ordinary skill in the art, other drawings may be obtained according to the structures shown in these drawings without paying creative labor.

The realization of the object of the present disclosure, functional features and advantages of the present disclosure will be further described with reference to the accompanying drawings in combination with the embodiments.

DETAILED DESCRIPTION OF THE EMBODIMENTS

The technical solutions in the embodiments of the present application will be described clearly and completely with reference to the drawings in the embodiments of the present application as follows. Obviously, the described embodiments are only a part of the embodiments of the present application, not all. All other embodiments obtained by persons skilled in the art based on the embodiments of the present disclosure without creative efforts shall fall within the protection scope of the present disclosure.

It should be noted that if directional indications (such as up, down, left, right, front, back, etc.) are involved in the embodiments of the present disclosure, the directional indications are only used to explain the relative positional relationship and movement between the components in a certain posture (as shown in the drawings), and if the specific posture changes, the directional indications will change accordingly.

In addition, if there are descriptions of "first" and "second" in the embodiments of the present disclosure, the descriptions of "first" and "second" are used for descriptive purposes only and cannot be understood as indicating or implying their relative importance or implicitly indicating the number of indicated technical features. Thus, features defining "first" and "second" may explicitly or implicitly include at least one of the features. In addition, the technical solutions in each embodiment may be combined, on the premise that the combinations may be achieved by ordinary skilled persons in the art. When the combinations of technical solutions are contradictory or impossible to achieve, it should be considered that such combinations do not exist and are out of the protection scope claimed by the present application.

The present application provides a display panel, which includes but is not limited to a liquid crystal display panel, an organic light emitting diode display panel, a field emission display panel, a plasma display panel and a curved surface type panel. The liquid crystal panel includes a Thin Film Transistor liquid crystal display panel, a TN panel, a VA type panel, an IPS panel and the like.

In the embodiment, the display panel is a liquid crystal display panel, which is used for a liquid crystal display module that is applied to a liquid crystal display device. It should be noted that the liquid crystal display device may be a liquid crystal television, a liquid crystal display, etc., but not limited to this. In particular, in the embodiment, the liquid crystal display device is configured as a Vertical Alignment (VA) display mode. As is known to all, VA mode is a display mode with advantages of high contrast, wide viewing angle, alignment without friction, etc. However, liquid crystals in VA mode rotate vertically and there exists large difference in birefringence of the liquid crystal molecules, causing worse color shift at large viewing angles.

At present, the mainstream structures of pixels designed to improve the color shift are structures of eight-domain pixels and of four-domain pixels. For an eight-domain pixels, a first pixel unit and a second pixel unit vertically adjacent to the first pixel unit are taken as example, in any one of the subpixels of the first pixel unit two four-domain-regions are designed (the two four-domain-regions respectively form a main area and a secondary area, and the area ratio of the main area to the secondary area is within a range from 4:6 to 3:7). The two four-domain-regions are respectively driven by a Thin Film Transistor so as to make the rotation angles of the liquid crystals in the two regions different, thereby realizing a wide viewing angle display as the eight-domain pixels. However, there are some obvious disadvantages for this, for instance, more Thin Film Transistors and capacitors are needed in the subpixels, which causes great decrease of the aperture ratio; further, due to a more complicated pixel circuit, there is serious image retention. Therefore, in order to improve the aperture ratio and the viewing angle, a design of dual pixel rendering for four-domain is currently preferred. This technology uses a combination of the subpixel of the first pixel unit and the subpixel of the second pixel unit that is corresponding to the former subpixel (the two subpixels respectively form a main area and a secondary area, and the area ratio of the main area to the secondary area is 1:1), and uses different voltages to control liquid crystals with different turning directions respectively, so as to realize display of 4-domain wide viewing angle.

Figure 1:
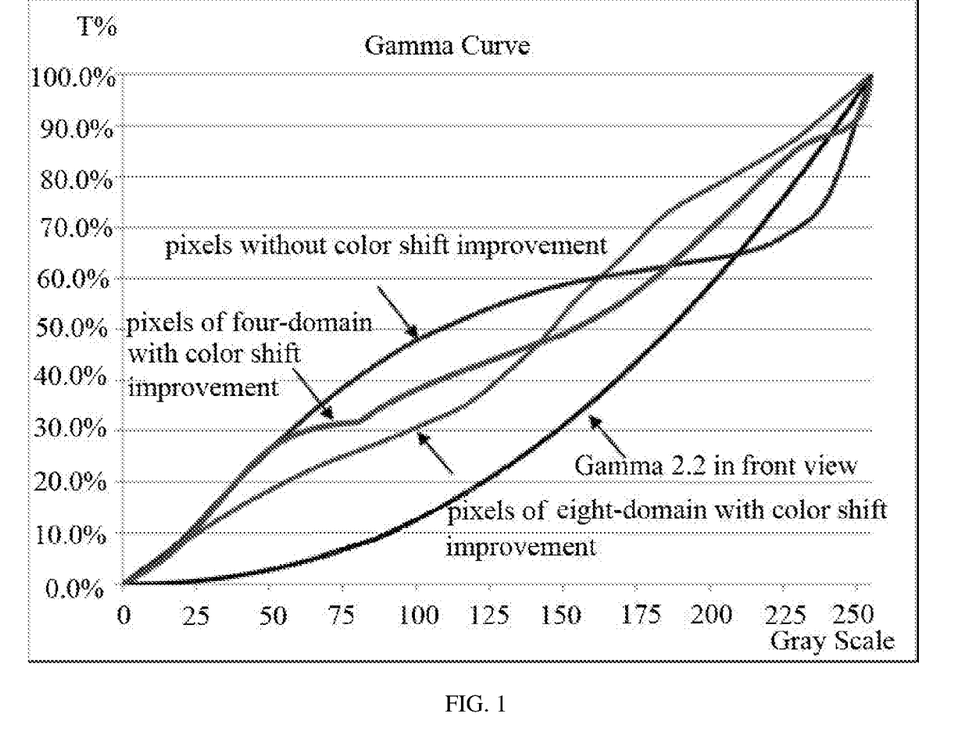
FIG. 1 is a comparison diagram of Gamma Curves of different pixel designs for improving color shift.

However, FIG. 1 shows a comparison of Gamma Curves of different pixel designs for improving color shift, Based on the judgment standard that it is better if the Gamma Curve of large viewing angle is closer to the front Gamma 2.2 when the gray scale is low-medium, it is easy to know that the color shift improved by 4-domain dual pixel rendering technology may not reach the color shift of 8-domain pixels, when at a low-medium gray scale. In other words, when the gray scale is low-medium, the effect of color shift improvement by the four-domain dual pixel rendering is not satisfied. Therefore, the liquid crystal display panel is needed to be improved to solve the problem.

Figure 2:
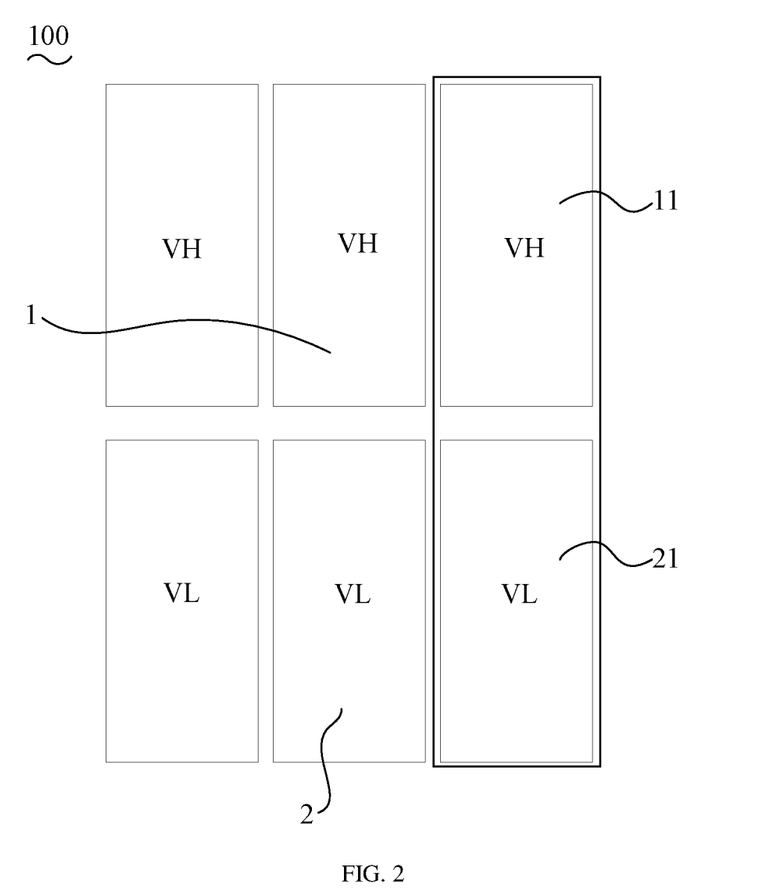
FIG. 2 is a structural diagram of a pixel design for improving color shift of a display panel according to an embodiment of the present disclosure.
Figure 3:
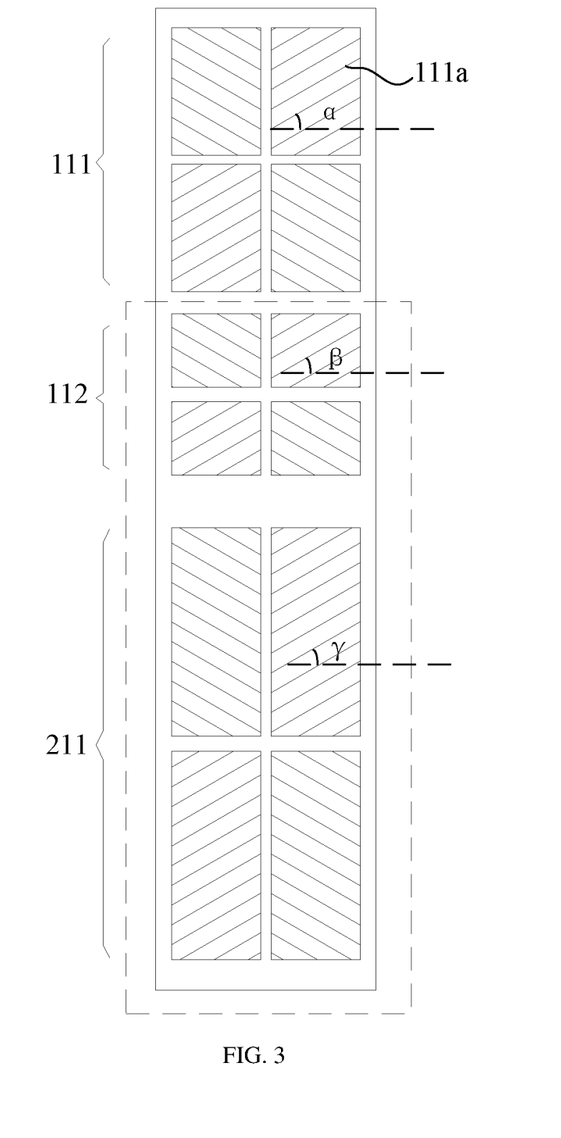
FIG. 3 is a structural diagram of two vertically adjacent subpixels of the subpixels in FIG. 2.

In the embodiment of the present application, referring to FIGS. 2 and 3, the display panel 100 includes: a plurality of pixel units which includes a first pixel unit 1 and a second pixel unit 2 arranged adjacently in the vertical direction. The first pixel unit 1 includes a first subpixel 11, and the second pixel unit 2 includes a second subpixel 21 corresponding to the first subpixel 11.

The first subpixel 11 includes a first region 111 and a second region 112 which are arranged vertically. The second region 112, being arranged closer to the second subpixel 21 with respect to the first region 111, includes a third region 113.

The transmittance of the first region 111 is smaller than that of the second region 112, and the area ratio of the second region 112 to the third region 211 is smaller than or equal to 4:6 and greater than or equal to 3:7.

It should be understood that the first region 111, the second region 112, and the third region 211 are all four-domain-regions, which are hereinafter referred to as the first four-domain-region, the second four-domain-region, and the third four-domain-region. Similar to the exemplary four-domain dual-pixel rendering technique, the first subpixel 11 and the second subpixel 21 respectively control the liquid crystals which have different turning direction through different voltages, so as to improve the color shift effect at large viewing angles without losing generality. In the embodiment, the voltage for controlling the first subpixel 11 is appropriately higher than the voltage for controlling the second subpixel 21. In addition, in the embodiment, the first pixel unit 1 and the second pixel unit 2 respectively include three subpixels of red, green and blue. The first subpixel 11 is any one of red, green and blue subpixels, and the second subpixel 21 is the same color as the first subpixel 11. Of course, in other embodiments, the first pixel unit 1 and the second pixel unit 2 may also include 4 or more subpixels, and the present design is not limited thereto.

First of all, the technical solutions of the present application only need one Thin Film Transistor for each subpixel, which is the same according to the technical solution of the exemplary four-domain dual pixel rendering. And, the difference between the technical solutions of the present application and that of the exemplary four-domain dual pixel rendering is that the domain design of the first subpixel 11 is different from that of the second subpixel 21 according to the present application. The first subpixel 11 includes a first four-domain-region and a second four-domain-region which are arranged vertically. The transmittance of the first four-domain-region is smaller than that of the second four-domain-region. The second subpixel 21 includes only the third four-domain-regions, and the area ratio of the second four-domain-region to the third four-domain-region is smaller than or equal to 4:6 and greater than or equal to 3:7, the second four-domain-region is close to the second subpixel 21. It is designed as such because a study on eight-domain pixels design by technical persons indicates that the most direct reason for its better color shift improvement than that of four-domain pixels design, at a low-medium gray scale, is that, for eight-domain pixels design, the area ratio of the main area to the secondary area is within a range from 4:6 to 3:7, while for four-domain dual pixel rendering, the area ratio of the main area and the secondary area is 1:1. Therefore, the second four-domain-region and the third four-domain-region are arranged according to the area ratio of eight-domain pixels design, and the area ratio is the ratio of the area of the main area to the area of the secondary area. Specifically, at a low-medium gray scale, for the first subpixel 11, the controlling voltages of the first four-domain-region and the second four-domain-region are consistent, but since the light transmittance of the first four-domain-region is smaller than that of the second four-domain-region, the brightness of the second four-domain-region is larger as a result. The second subpixel 21 is controlled to maintain a lower voltage, so as to make the third four-domain-region maintain a lower brightness. Based on the area ratio of the second four-domain-region to the third four-domain-region, the second four-domain-region forms a main area of an eight-domain pixels design to improve color shift, and the third four-domain-region forms the secondary area of the eight-domain pixels to improve color shift. The two areas work together, forming a subpixel of the eight-domain pixels with low color shift. In other words, the technical solutions of the present application may realize the improved color shift of eight-domain pixels without arranging a plurality of Thin Film Transistors in each sub-pixel, and complicated pixel circuits. It should be noted that each subpixel may control the on/off of data signals by arranging a Thin Film Transistor, or by switching units such as triode and MOS transistor. The design is not limited to this.

According to the technical solutions of the present application, which are based on an exemplary four-domain dual pixel rendering technology, the first subpixel 11 of the first pixel unit 1 is designed to include a first four-domain-region and a second four-domain-region which are vertically arranged (the transmittance of the first four-domain-region is smaller than that of the second four-domain-region), and the second subpixel 21 of the second subpixel unit 2 corresponding to the first subpixel 11 is designed to include a third four-domain-region, the second subpixel unit 2 is vertically adjacent to the first pixel unit 1. The second four-domain-region is arranged close to the third four-domain-region, and the ratio of the area of the second four-domain-region to the area of the third four-domain-region is smaller than or equal to 4:6 and greater than or equal to 3:7. Thereby, when the display panel 100 is at a low-medium gray scale, the voltage between the first subpixel 11 and the second subpixel 21 is controlled so as to make the second four-domain-region form a main area of eight-domain pixels designed for improving the color shift (different transmittance makes the second four-domain-region distinct from the first four-domain-region), and to make the third four-domain-region form a secondary area of eight-domain pixels designed for improving the color shift. That is, the two areas cooperatively form a subpixel of eight-domain pixels with low color shift. Compared with the solution that using eight-domain pixels structure to improve the color shift, the technical solutions of the present application do not need to arrange a plurality of Thin Film Transistors in each subpixel, and a complex pixel circuit. Thereby, the aperture ratio of the pixel is increased and image retention is avoided.

It is easy to understand that too large area difference between the first pixel unit 1 and the second pixel unit 2 may affect the imaging effect of the display panel 100, and go against the array arrangement of pixel units on the display panel 100, in which the pixel units are corresponding to their respective sub-pixels. That is, the area difference between the subpixels of the first pixel unit 1 and the subpixels of the second pixel unit 2 corresponding to that of the first subpixels should be controlled to be not too large. Since the area of the first subpixel 11 is a total of the areas of the first and second four-domain-regions, and the area of the second subpixel 21 is the area of the third four-domain-regions. Therefore, in the embodiment, firstly, the area of the first four-domain-region should be ensured to be smaller than the area of the third four-domain-regions so as to reduce the area difference between the first subpixel 11 and second subpixel 21. In particular, in order to better improve the color shift effect of the pixel design, in the embodiment, the area of the first four-domain-region is larger than the area of the second four-domain-region, and specifically, the area ratio of the second four-domain-region to the first four-domain-region is greater than or equal to 4:6 and smaller than or equal to 3:7. That is, when the gray scale is low-medium, the improved color shift of eight-domain pixels may be achieved by combination of the second four-domain-region and the third four-domain-region. The brightness of the first and the second four-domain-regions, and the area ratio of the second four-domain-region to the first four-domain-region may also meet the requirements of the main area and the secondary area of the eight-domain pixels for improving the color shift. Therefore, the two may also form a subpixel of eight-domain pixels with low color shift. Thereby, undoubtedly, the overall color shift of the display panel 100 may be improved effectively. It should be noted that this design is not limited to this. In other embodiments, the area of the first four-domain-region may also be smaller than the area of the second four-domain-region.

Without losing generality, in the embodiment, referring to FIGS. 2 and 3, a total of the areas of the first four-domain-region and the second four-domain-region is equal to the area of the third four-domain-region, so that the areas of the first subpixel 11 and the second subpixel 21 are equal (the areas of other corresponding subpixels of the two pixel units are also equal), which may ensure that the areas of the first pixel unit 1 and the second pixel unit 2 are equal, thereby improving the imaging effect of the display panel 100. It should be noted that this design is not limited to this. In other embodiments, the area of the first pixel unit 1 and the area of the second pixel unit 2 may be different, in other words, the area of the first subpixel 11 may be different from the area of the second subpixel 21.

Regarding the light transmittance of the third four-domain-region, although the display panel 100 may reduce the controlling voltage of the second subpixel 21 when at a low-medium gray scale to make the voltage difference between the third four-domain-region and the second four-domain-region large enough, so as to make the brightness difference between the two large enough to meet the requirements of brightness difference between the main area and the secondary area of the eight-domain pixels with low color shift, The value of the controlling voltage of the subpixels is generally within an adjusting range, as a result, the brightness difference between the two may not reach the standard, when the voltage has been adjusted to an extreme value. Therefore, in the embodiment, in order to make the brightness difference between the two at a low-medium gray scale larger, the light transmittance of the third four-domain-region is smaller than that of the second four-domain-region. Thus, when the display panel 100 is at a low-medium gray scale, the brightness of the third four-domain-region may be further reduced to lower at low voltage combined with low light transmittance, to meet the brightness requirement of the secondary area of subpixel of the eight-domain pixels with low color shift.

However, the light transmittance of the third four-domain-region also should not be too small, because when the display panel 100 is at a high gray scale, the brightness of the first pixel unit 1 and the second pixel unit 2 should be ensured to be as consistent as possible, so that the display panel 100 may achieve a best imaging effect. It means that the brightness of the first subpixel 11 and the brightness of the second subpixel 21 should be ensured to be consistent, when reflecting to the subpixels of each pixel unit. The variables that determine the brightness of the subpixels are nothing but the area, the controlling voltage and light transmittance. In this case, the controlling voltage of the first subpixel 11 is basically consistent with the controlling voltage of the second subpixel 21, and the area of the first subpixel 11 is basically consistent with the area of the second subpixel 21. That is, in order to ensure that the brightness of the first subpixel 11 and the brightness of the second subpixel 21 are consistent, it is necessary to ensure that the light transmittance of the first subpixel 11 is consistent with the light transmittance of the second subpixel 21, and the light transmittance of the first subpixel 11 is between the light transmittance of the first four-domain-region and the light transmittance of the second four-domain-region. That is, the light transmittance of the second subpixel 21 (the light transmittance of the third four-domain-region) should be between the light transmittance of the first four-domain-region and the light transmittance of the second four-domain-region. In other words, when being smaller than the light transmittance of the second four-domain-region, the light transmittance of the third four-domain-region should also be greater than the light transmittance of the second four-domain-region. It should be noted that this design is not limited to this. In other embodiments, when at a low-medium gray scale, the transmittance of the third four-domain-regions may be larger than that of the second four-domain-region or smaller than that of the first four-domain-regions, on the premise that a subpixel of the eight-domain with a low color shift is formed by the second four-domain-region cooperating with the third four-domain-region.

As is known to all, the transmittance of the subpixels is closely related to the arrangement of the pixel electrodes 111a of the subpixels. In the embodiment, the pixel electrodes 111a of the first four-domain-region, the second four-domain-region and the third four-domain-region are all arranged in stripes. It can be understood that stripe patterns are the widely used arrangements of the pixel electrodes 111a in the prior art, which have the advantages of stable conduction, simple, and the like. In particular, for the four-domain design of each light-transmitting region, in order to enhance the overall light-transmitting effect and color shift improvement effect of the light-transmitting region, the pixel electrodes 111a of any two laterally adjacent or longitudinally adjacent domains are mirrored. It should be noted that the present design is not limited to this. In other embodiments, the stripe design of the four-domain of each light-transmitting region may also be in other forms. Of course, the pixel electrodes 111a of the first four-domain-region, the second four-domain-region and the third four-domain-region may also be specifically designed as arc-shaped pattern combinations, etc. The present design is not limited to this.

As mentioned earlier, the light transmittance of the first four-domain-region is smaller than the light transmittance of the third four-domain-region, and the light transmittance of the third four-domain-region is smaller than the light transmittance of the second four-domain-region. While for the striped pixel electrode 111a, it is easy to know that when the included angle formed between the extending direction of the pixel electrode 111a and the horizontal direction is 45 degrees, the light transmittance is the largest, and the transmittance decreases as the included angle decreases. Therefore, in the embodiment, the inclination angle of the pixel electrodes 111a of the domains corresponding to the first four-domain-region, the second four-domain-region, and the third four-domain-region are correspondingly adjusted according to this principle. Specifically, referring to FIG. 3, included angles formed between a horizontal direction and extending directions of the pixel electrodes in mutually corresponding domains of the first four-domain-region, the second four-domain-region and the third four-domain-region are respectively $\alpha$, $\beta$, $\gamma$, the domains are corresponding to each other, and the light transmittance corresponding to each four-domain-region makes $\alpha$, $\beta$ and $\gamma$ meet the requirement of $|\beta-45°|<|\gamma-45°|<|\alpha-45°|$. Thereby, even if when the included angle between the extending direction of the pixel electrode 111a in the second four-domain-region and the extending direction of the maximum light transmittance is the smallest, the light transmittance decreases the leas. When the included angle between the extending direction of the pixel electrode 111a in the first four-domain-region and the extending direction of the maximum light transmittance is the largest, and the light transmittance decreases the most. The included angle between the arrangement direction of the pixel electrode 111a in the third four-domain-regions and the extending direction of the maximum light transmittance is between the second and first four-domain-regions, and correspondingly, the reduction value of light transmittance is also between the second and first four-domain-regions, so as to achieve the result that the light transmittance of the first four-domain-region is smaller than the light transmittance of the third four-domain-region, and the light transmittance of the third four-domain-region is smaller than the light transmittance of the second four-domain-regions. Without losing generality, in the embodiment, $\alpha$, $\beta$ and $\gamma$ are all within the range of 0 degree to 45 degrees. Of course, in other embodiments, $\alpha$, $\beta$ and $\gamma$ also may be within the range of 45 degrees to 90 degrees, and this design is not limited to this. In addition, it should be noted that the technical solutions of the present application are not limited to changing the light transmittance of each four-domain-region by changing the inclination angle of the pixel electrode 111a. In other embodiments, the result that the light transmittance of the first four-domain-region is smaller than the light transmittance of the third four-domain-region and the light transmittance of the third four-domain-region is smaller than the light transmittance of the second four-domain-region, may also be achieved by changing the width, distance, etc. of each striped pixel electrode 111a.

The present application also provides a display device, which includes a display panel. The specific structure of the display panel refers to the above-mentioned embodiments. Since the display device adopts all the technical solutions of the above-mentioned embodiments, it has at least all the beneficial effects brought by the technical solutions of the above-mentioned embodiments, which will not be repeated here.

The above description is only for some preferred embodiments of the present application, and is not intended to limit the patent scope of the present application. Any equivalent structural transformation made by using the description and drawings of the present application, or direct/indirect application of the description and drawings in other related technical fields, under the inventive concept of the present application, are included in the patent protection scope of the present application.

What is claimed is:
1. A display panel, comprising:
a plurality of pixel units, comprising a first pixel unit and a second pixel unit adjacently arranged in a vertical direction, the first pixel unit comprising a first subpixel, and the second pixel unit comprising a second subpixel corresponding to the first subpixel; wherein,
the first subpixel is divided into a first region and a second region vertically arranged, the second subpixel is a third region as a whole, the first region, the second region, and the third region are four-domain-regions, and the second region is arranged closer to the second subpixel with respect to the first region; and
a transmittance of the first region is smaller than a transmittance of the second region, and a ratio of an area of the second region to an area of the third region is smaller than or equal to 4:6 and greater than or equal to 3:7.

2. The display panel according to claim 1, wherein an area of the first region is larger than the area of the second region and is smaller than the area of the third region.

3. The display panel according to claim 2, wherein a ratio of the area of the second region to the area of the first region is smaller than or equal to 4:6 and greater than or equal to 3:7.

4. The display panel according to claim 1, wherein a total of the area of the first region and the area of the second region is equal to the area of the third region.

5. The display panel according to claim 1, wherein a transmittance of the third region is larger than the transmittance of the first region and smaller than the transmittance of the second region.

6. The display panel according to claim 5, wherein pixel electrodes of the first region, the second region and the third region are respectively arranged in stripes, and included angles formed between a horizontal direction and extending directions of the pixel electrodes in mutually corresponding domains of the first region, the second region and the third region are respectively α, β, γ; and α, β and γ meet a requirement of |β−45°|<|γ−45°|<|α−45°|.

7. The display panel according to claim 6, wherein α, β, and γ are all within a range from 0 degree to 45 degrees.

8. The display panel according to claim 5, wherein a brightness of the first subpixel is consistent with a brightness of the second subpixel, when the display panel is at a high gray scale.

9. The display panel according to claim 1, wherein the first subpixel is arranged corresponding to a switch unit.

10. The display panel according to claim 1, wherein a thin film transistor is arranged in each of subpixels.

11. A display panel, comprising:
a plurality of pixel units, comprising a first pixel unit and a second pixel unit adjacently arranged in a vertical direction, the first pixel unit comprising a first subpixel, and the second pixel unit comprising a second subpixel corresponding to the first subpixel;
the first subpixel being divided into a first region and a second region vertically arranged, the second subpixel being a third region as a whole, the second region being arranged closer to the second subpixel with respective to the first region; the first region, the second region and the third region being all four-domain-regions, a voltage of the first subpixel being controlled to be larger than a voltage of the second subpixel; and
a transmittance of the first region being smaller than a transmittance of the second region, and a ratio of an area of the second region to an area of the third region being smaller than or equal to 4:6 and greater than or equal to 3:7.

12. A display device, comprising a display panel, the display panel comprising:
a plurality of pixel units, comprising a first pixel unit and a second pixel unit adjacently arranged in a vertical direction, the first pixel unit comprising a first subpixel, and the second pixel unit comprising a second subpixel corresponding to the first subpixel;
the first subpixel being divided into a first region and a second region vertically arranged, the second subpixel being a third region as a whole, the first region, the second region, and the third region being all four-domain-regions, and the second region being arranged closer to the second subpixel with respect to the first region; and
a transmittance of the first region being smaller than a transmittance of the second region, and the ratio of an area of the second region to an area of the third region being smaller than or equal to 4:6 and greater than or equal to 3:7.

13. The display device according to claim 12, wherein an area of the first region is larger than the area of the second region and is smaller than the area of the third region.

14. The display device according to claim 13, wherein a ratio of the area of the second region to the area of the first region is smaller than or equal to 4:6 and greater than or equal to 3:7.

15. The display device according to claim 12, wherein a total of the area of the first region and the area of the second region is equal to the area of the third region.

16. The display device according to claim 12, wherein a transmittance of the third region is larger than the transmittance of the first region and is smaller than the transmittance of the second region.

17. The display device according to claim 16, wherein pixel electrodes of the first region, the second region and the third region are respectively arranged in stripes, and included angles formed between a horizontal direction and extending directions of the pixel electrodes in mutually corresponding domains of the first region, the second region and the third region are respectively α, β, γ; and α, β and γ meet a requirement of |β−45°|<|γ−45°|<|α−45°|.

18. The display device according to claim 16, wherein a brightness of the first subpixel is consistent with a brightness of the second subpixel, when the display panel is at a high gray scale.

19. The display device according to claim 12, wherein the first subpixel is arranged corresponding to a switch unit.

20. The display device according to claim 12, wherein a thin film transistor is arranged in each of subpixels.

* * * * *